United States Patent
Jiang et al.

(10) Patent No.: US 11,972,645 B2
(45) Date of Patent: Apr. 30, 2024

(54) SYSTEM AND METHOD FOR DETERMINING MOST PROBABLE CAUSE OF VEHICLE FAULT USING MULTIPLE DIAGNOSTIC TECHNIQUES

(71) Applicant: GM GLOBAL TECHNOLOGY OPERATIONS LLC, Detroit, MI (US)

(72) Inventors: Shengbing Jiang, Rochester Hills, MI (US); Zifeng Peng, Rochester Hills, MI (US); Chaitanya Sankavaram, Rochester Hills, MI (US); Michael B. Gastmeier, Clinton Township, MI (US); Brian Buck, Highland, MI (US); John J. Flood, IV, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 435 days.

(21) Appl. No.: 17/333,344

(22) Filed: May 28, 2021

(65) Prior Publication Data
US 2022/0383670 A1    Dec. 1, 2022

(51) Int. Cl.
*G07C 5/08* (2006.01)
*G05B 13/02* (2006.01)
*G05B 13/04* (2006.01)

(52) U.S. Cl.
CPC ....... *G07C 5/0808* (2013.01); *G05B 13/0265* (2013.01); *G05B 13/042* (2013.01)

(58) Field of Classification Search
CPC .............. G07C 5/0808; G05B 13/0265; G05B 13/042; G05B 23/0275; G01M 17/007
See application file for complete search history.

(56) References Cited

U.S. PATENT DOCUMENTS

| | | | |
|---|---|---|---|
| 8,996,235 B2 * | 3/2015 | Singh | G05B 23/0278 701/31.4 |
| 10,275,548 B1 * | 4/2019 | Kodali | G06F 30/20 |
| 10,650,616 B2 * | 5/2020 | Zhang | G07C 5/0816 |
| 2020/0184742 A1 * | 6/2020 | Jiang | G07C 5/008 |
| 2021/0118242 A1 * | 4/2021 | Gautam | G07C 5/0841 |
| 2022/0169264 A1 * | 6/2022 | Du | G07C 5/006 |
| 2022/0306050 A1 * | 9/2022 | Rich | B60S 5/00 |
| 2023/0239639 A1 * | 7/2023 | Ueda | G10L 25/51 381/56 |

FOREIGN PATENT DOCUMENTS

| | | |
|---|---|---|
| WO | WO-2014173818 A2 | 10/2014 |
| WO | WO-2019109915 A1 | 6/2019 |

OTHER PUBLICATIONS

U.S. Appl. No. 17/333,329, filed May 28, 2021, Jiang et al.

* cited by examiner

*Primary Examiner* — Sizo B Vilakazi (57) ABSTRACT

A system includes a first most probable cause (MPC) module, a second MPC module, and an integrated MPC module. The first MPC module is configured to determine a first most probable cause of an issue on a vehicle based on at least one service procedure for the vehicle. The second MPC module is configured to determine a second most probable cause of the issue based on repair data for other vehicles. The integrated MPC module is configured to determine an integrated most probable cause of the issue based on the first and second most probable causes.

20 Claims, 5 Drawing Sheets

|    | 70 | 72 | 74 | 76 |
|----|----|----|----|----|
| 64 | X  | X  | X  |    |
| 66 |    | X  | X  | X  |
| 68 | X  | X  |    |    |

FIG. 3A

| 70 | 2/8=25%   |
|----|-----------|
| 72 | 3/8=37.5% |
| 74 | 2/8=25%   |
| 76 | 1/8=12%   |

| | 90 | | 92 | | 94 | |
|---|---|---|---|---|---|---|
| | 96 | 98 | 96 | 98 | 96 | 98 |
| 86 | 0.25 | 0.5 | 0.45 | 0.9 | 0.1 | 0.1 |
| 88 | 0.25 | 0 | 0.45 | 0 | 0.45 | 0 |
| 82 | 0.1 | 0.1 | 0.1 | 0.1 | 0 | 0 |
| 84 | 0.4 | 0.4 | 0 | 0 | 0.45 | 0.9 |

SYSTEM AND METHOD FOR DETERMINING MOST PROBABLE CAUSE OF VEHICLE FAULT USING MULTIPLE DIAGNOSTIC TECHNIQUES

CROSS-REFERENCE TO RELATED APPLICATIONS

This application is related to U.S. Patent Application Ser. No. 17/333,329 filed on May 28, 2021 and entitled "System and Method for Generating Diagnostic Procedure for Vehicle Fault Based on Most Probable Causes." The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for determining most probable cause of a vehicle fault using multiple diagnostic techniques.

A controller of a vehicle typically sets a diagnostic trouble code and activates a service indicator (e.g., a check engine light) when the vehicle has an issue. The controller determines that the vehicle has the issue when one or more operating parameters of the vehicle are within a predetermined range. The service indicator informs the vehicle user to bring the vehicle to a repair shop for service. A service technician connects a service tool to the controller to retrieve the diagnostic trouble codes that are set and identifies the issue based on the diagnostic trouble code.

SUMMARY

An example of a system according to the present disclosure includes a first most probable cause (MPC) module, a second MPC module, and an integrated MPC module. The first MPC module is configured to determine a first most probable cause of an issue on a vehicle based on at least one service procedure for the vehicle. The second MPC module is configured to determine a second most probable cause of the issue based on repair data for other vehicles. The integrated MPC module is configured to determine an integrated most probable cause of the issue based on the first and second most probable causes.

In one aspect, the second MPC module is configured to determine the second most probable cause of the issue based on the repair data using machine learning.

In one aspect, the repair data includes a diagnostic trouble code identifying the issue, a frequency at which the diagnostic trouble code are set on the other vehicles, and a vehicle operating parameter captured when the issue occurred on the other vehicles.

In one aspect, each of the first, second, and integrated most probable causes includes labor codes and corresponding probabilities, and each probability indicates a likelihood that performing a task identified by the corresponding labor code will resolve the issue.

In one aspect, the second MPC module is configured to determine the probabilities of the labor codes in the second most probable cause based on a number of times that performing the tasks identified by the labor codes resolved the issue in the other vehicles.

In one aspect, the issue is identified using multiple diagnostic trouble codes, the at least one service procedure includes multiple service procedures, with each service procedure corresponding to one of the diagnostic trouble codes, and the first MPC module is configured to determine the probabilities of the labor codes based on a number of times that the labor codes are specified in the service procedures for the diagnostic trouble codes.

In one aspect, the integrated MPC module is configured to determine a first weighting value and a second weighting value, and set the integrated most probable cause equal to a sum of (i) a product of the first weighting value and the first most probable cause and (ii) a product of the second weighting value and the second most probable cause.

In one aspect, the integrated MPC module is configured to determine an actual root cause distribution based on the repair data for the other vehicles and diagnostic trouble codes identifying the issue, and adjust the first and second weighting values based on (i) a first distance between the first most probable cause and the actual root cause distribution and (ii) a second distance between the second most probable cause and the actual root cause distribution.

In one aspect, the integrated MPC module is configured to determine the first and second weighting values based on a frequency of the diagnostic trouble codes identifying the issue.

In one aspect, the first MPC module is configured to determine the first most probable cause for a first diagnostic trouble code identifying the issue, the first diagnostic trouble code occurring on the other vehicles at a first frequency, and determine a third most probable cause for a second diagnostic trouble code identifying the issue, the second diagnostic trouble code occurring on the other vehicles at a second frequency that is less than the first frequency.

In one aspect, the system further includes a third MPC module configured to determine a third most probable cause of the issue based on a physics model that relates a symptom of the vehicle to a failure mode of the vehicle. The vehicle has the symptom when an operating parameter of the vehicle is within a predetermined range.

In one aspect, the integrated MPC module is configured to determine a first weighting value, a second weighting value, and a third weighting value, and set the third most probable cause equal to a sum of (i) a product of the first weighting value and the first most probable cause, (ii) a product of the second weighting value and the second most probable cause, and (iii) a product of the third weighting value and the third most probable cause.

In one aspect, the integrated MPC module is configured to determine the first, second, and third weighting values based on (i) a frequency of a diagnostic trouble code identifying the issue and (ii) whether the physics model applies to the issue.

Another example of a system according to the present disclosure includes a diagnostic knowledge module and a user interface device (UID) control module. The diagnostic knowledge module is configured to determine a most probable cause of an issue on a vehicle based on diagnostic trouble codes identifying the issue and service procedures for the vehicle and the diagnostic trouble codes. The UID control module is configured to control a user interface device to display the most probable cause of the issue.

In one aspect, the most probable cause includes labor codes and corresponding probabilities, each probability indicating a likelihood that performing a task identified by the corresponding labor code will resolve the issue, and the diagnostic knowledge module is configured to determine the probabilities of the labor codes based on a number of times that the labor codes are specified in the service procedures.

Another example of a system according to the present disclosure includes a diagnostic knowledge module, a machine learning module, a physics model module, and an integrated MPC module. The diagnostic knowledge module is configured to determine a first most probable cause of an issue on a vehicle based on a first diagnostic trouble code identifying the issue and service procedures for the vehicle. The first diagnostic trouble code occurs at a first frequency on other vehicles. The diagnostic knowledge module is configured to determine a second most probable cause of the issue based on a second diagnostic trouble code identifying the issue and the service procedures for the vehicle. The second diagnostic trouble code occurs at a second frequency on the other vehicles that is less than the first frequency. Each of the service procedures corresponds to one of the first and second diagnostic trouble codes. The machine learning module is configured to determine a third most probable cause of the issue based on repair data for other vehicles using machine learning. The physics model module is configured to determine a fourth most probable cause of the issue based on a physics model that relates an operating parameter of the vehicle to a failure mode of the vehicle. The integrated MPC module is configured to determine an integrated most probable cause of the issue based on the first, second, third, and fourth most probable cause.

In one aspect, each of the first and second most probable causes includes labor codes and corresponding probabilities, each probability indicates a likelihood that performing a task identified by the corresponding labor code will resolve the issue, and the diagnostic knowledge module is configured to determine the probabilities of the labor codes in the first most probable cause based on a number of times that the labor codes are specified in the service procedures for the first diagnostic trouble code, and determine the probabilities of the labor codes in the second most probable cause based on a number of times that the labor codes are specified in the service procedures for the second diagnostic trouble code.

In one aspect, the integrated MPC module is configured to determine a first weighting value, a second weighting value, a third weighting value, and a fourth weighting value, and set the integrated most probable cause equal to a sum of (i) a product of the first weighting value and the first most probable cause, (ii) a product of the second weighting value and the second most probable cause, (iii) a product of the third weighting value and the third most probable cause, and (iv) a product of the fourth weighting value and the fourth most probable cause.

In one aspect, the integrated MPC module is configured to determine the first, second, third, and fourth weighting values based on (i) the first frequency at which the first diagnostic trouble code is set on the other vehicles, (ii) the second frequency at which the second diagnostic trouble code is set on the other vehicles, and (iii) whether the physics model applies to the issue.

In one aspect, the integrated MPC module is configured to determine an actual root cause distribution based on the repair data for the other vehicles and the diagnostic trouble codes identifying the issue, and adjust the first, second, third, and fourth weighting values based on (i) a first distance between the first most probable cause and the actual root cause distribution, (ii) a second distance between the second most probable cause and the actual root cause distribution, (iii) a third distance between the third most probable cause and the actual root cause distribution, and (iv) a fourth distance between the fourth most probable cause and the actual root cause distribution.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicle manufacturers typically create a service procedure for each diagnostic trouble code that may be set for every vehicle model. Each service procedure contains a list of tasks to be performed to resolve the issue identified by the corresponding diagnostic trouble code, as well as labor codes identifying the tasks. In many cases, a vehicle controller sets more than one diagnostic trouble code. In these cases, the service technician must perform each service procedure until the issue is resolved. This approach may lead to performing the same task multiple times, and may not be an efficient way to diagnose the issue.

Diagnostic techniques have been developed to assist a service technician in diagnosing an issue on a vehicle more efficiently than simply performing the service procedure corresponding to the diagnostic trouble code identifying the issue. For example, U.S. Patent Pub. No. 2020/0184742 describes a method of diagnosing a vehicle fault using field repair data and machine learning. However, one diagnostic technique may be more reliable than another diagnostic technique for certain vehicle issues, and the service technician may not select the diagnostic technique with the highest reliability for a given vehicle issue.

A system and method according to the present disclosure determines a most probable cause of a vehicle fault using different diagnostic techniques and integrates the most probable causes in a way that yields an integrated most probable cause with high reliability. In one example, the system and method applies the weighting values to the most probable causes before integrating them. In addition, the system and method determines one of the most probable causes using diagnostic knowledge provided by service procedures for multiple diagnostic trouble codes, which may be more efficient than performing the service procedures one by one.

Figure 1:
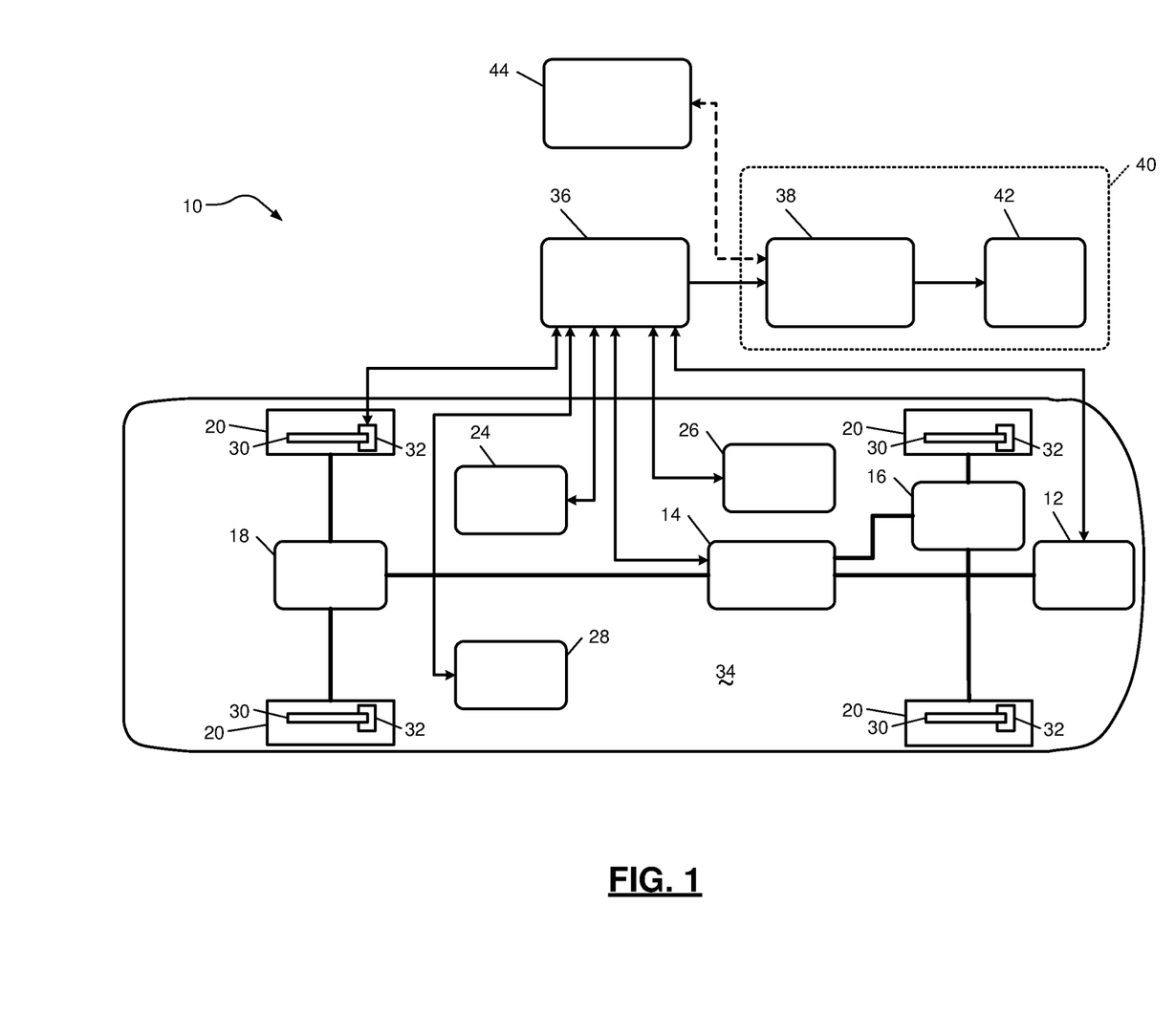
FIG. 1 is a functional block diagram of an example vehicle and an example diagnostic system according to the principles of the present disclosure.

Referring now to FIG. 1, a vehicle 10 includes an engine 12, a transmission 14, a front differential 16, a rear differential 18, wheels 20, friction brakes 22, a fuel system 24, a heating, ventilation, and air-conditioning (HVAC) system 26, and an exhaust system 28. The engine 12 combusts a mixture of air and fuel to produce drive torque. The transmission 14 transfers torque produced by the engine 12 to the front and rear differentials 16 and 18 at a plurality of gear ratios.

The front differential 16 transfers torque from the transmission 14 to the front wheels 20 of the vehicle 10 while allowing the front wheels 20 to rotate at different speeds. The rear differential 18 transfers torque from the transmission 14 to the rear wheels 20 of the vehicle 10 while allowing the rear wheels 20 to rotate at different speeds. The friction brakes 22 decrease the speed of the vehicle 10 when the friction brakes 22 are applied. In the example shown, the friction brakes 22 are disc brakes, and each friction brake 22 includes a rotor 30 at a caliper 32. When the friction brake 22 is applied, the caliper 32 presses a pair of brake pads (not shown) against the rotor 30 to create friction and thereby decrease the rotational speed of the wheel 20. The friction brakes 20 collectively make up a brake system of the vehicle 10.

The fuel system 24 supplies fuel to the engine 12. The HVAC system 26 regulates the temperature of air within a cabin 34 of the vehicle 10. In addition, the HVAC system 26 may regulate the temperature of fluids circulating through the engine 12 and the transmission 14. The exhaust system 28 reduces emissions in exhaust gas produced by the engine 12 before releasing the exhaust gas into the atmosphere.

The vehicle 10 further includes a vehicle control module 36 that controls the engine 12, the transmission 14, the friction brakes 22, the fuel system 24, the HVAC system 26, and the exhaust system 28 based on user inputs and sensor inputs. The user inputs indicate target operating parameters of the vehicle 10 such as a target vehicle acceleration, a target vehicle deceleration, a target vehicle speed, and a target cabin temperature. The sensor inputs indicate actual values of operating parameters of the vehicle 10 measured by sensors (not shown) on the vehicle 10. The vehicle control module 36 controls the engine 12, the transmission 14, the friction brakes 22, the fuel system 24, the HVAC system 26, and the exhaust system 28 by outputting control signals thereto.

In addition, when the vehicle 10 experiences an issue, the vehicle control module 36 sets one or more diagnostic trouble codes identifying the issue and records one or more operating parameters of the vehicle 10 when the issue occurs. The vehicle control module 36 may record vehicle operating parameters that are measured by the sensors when the issue occurs. Additionally or alternatively, the vehicle control module 36 may estimate vehicle operating parameters based on vehicle operating parameters that are measured when the issue occurs and record the estimated vehicle operating parameters. The vehicle control module 36 outputs the diagnostic trouble codes and the vehicle operating parameters.

A most probable cause (MPC) module 38 determines a most probable cause of the issue based on the diagnostic trouble codes and the vehicle operating parameters using multiple diagnostic techniques. In the example shown, the MPC module 38 is part of a service tool 40 that also includes a user interface device 42. In other examples, the MPC module 38 and/or the user interface device 42 may be included in the vehicle 10.

In one example, the MPC module 38 determines a first most probable cause of the issue based on service procedures, determines a second most probable cause of the issue based on repair data, and determines an integrated most probable cause based on the first and second most probable causes. The service procedures are associated with the vehicle 10 and the diagnostic trouble codes. The repair data is associated with vehicles other than the vehicle 10.

The MPC module 38 may receive the repair data from a cloud module 44 via a wired or wireless signal. The cloud module 44 may be a remote server and/or may be located in a global service headquarters for a manufacturer of the vehicle 10. In the example shown, the MPC module 38 and the cloud module 44 communicate with one another using a wireless signal that is represented using a dashed line.

In one example, each of the first, second, and integrated most probable causes indicates labor codes and corresponding probabilities. Each labor code identifies the task and each probability indicates the likelihood that performing the task identified by the corresponding labor code will resolve the issue. In this example, the MPC module 38 determines the first most probable cause of the issue based on a number of times that the labor codes are specified in the service procedures for the diagnostic trouble codes.

The MPC module 38 may control the user interface device 42 to generate a message indicating the most probable cause(s) of the issue. The user interface device 42 is operable to generate a visual message (e.g., text, a light, and/or a symbol), an audible message (e.g., a chime), and/or a tactile message (e.g., a vibration). The user interface device 42 may include an electronic display (e.g., a touchscreen), a speaker, and/or a vibrating motor.

Figure 2:
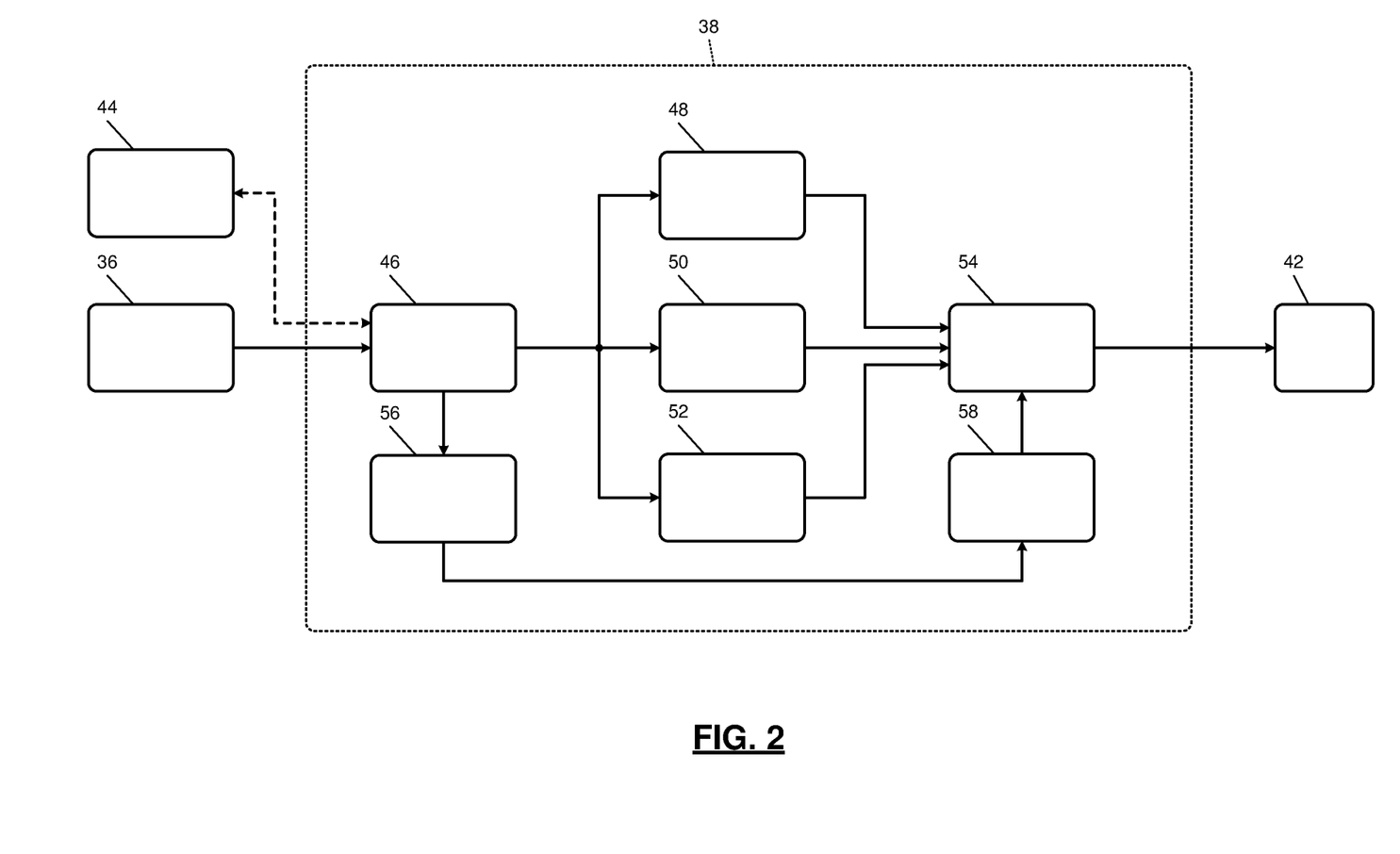
FIG. 2 is a functional block diagram of an example diagnostic module according to the principles of the present disclosure.

Referring now to FIG. 2, an example implementation of the MPC module 38 includes a repair data module 46, a diagnostic knowledge module 48, the machine learning module 50, a physics model module 52, and an integrated MPC module 54. The repair data module 46 stores and outputs repair data. The repair data includes diagnostic trouble codes identifying issues that occurred on other vehicles, frequencies of the diagnostic trouble codes, parameter identifications, and failure records. Each parameter identifications is a vehicle operating parameter measured or estimated when a vehicle issue occurred. Each failure record includes a set of vehicle operating parameters measured or estimated when a vehicle issue occurred. The frequency of a diagnostic trouble code indicates how often the diagnostic trouble code was set in the other vehicles relative to how often other diagnostic trouble codes were set in the other vehicles.

The repair data may also include labor codes and/or part replacements. A labor code identifies a task to be performed as part of a service procedure to resolve an issue. If the task involves replacing a part, the labor code may also identify part replacements. The repair data may include which parts were replaced and/or which labor codes (or tasks identified thereby) were performed in an attempt to resolve the issue, as well as which part replacements and/or labor codes actually fixed the issue. The repair data module 46 receives the repair data for the other vehicles from the cloud module 44. In addition, the repair data module 46 may send repair data for the vehicle 10 to the cloud module 44. The MPC module 38 may use the repair data sent to the cloud module 44 to diagnose issues on the other vehicles. The other vehicles may have the same make and model as the vehicle 10. Additionally or alternatively, the other vehicles may have the same type of system as the system in the vehicle 10 (e.g., engine 12, the transmission 14) that has the issue.

The diagnostic knowledge module 48 determines a most probable cause of an issue on the vehicle 10 based on diagnostic trouble codes identifying the issue and service procedures for the vehicle 10. Diagnostic knowledge is knowledge provided by the service procedures. The service procedures list tasks to be performed to resolve the issue and labor codes identifying the tasks. Each service procedure may correspond to one or more of the diagnostic trouble codes. Each most probable cause described herein may include labor codes and corresponding probabilities. Each labor code identifies a task or group of tasks to be performed to resolve the issue. Each probability indicates the likelihood that performing the task(s) identified by the corresponding labor code will resolve the issue. The faults that are addressed by performing the tasks indicated by the labor codes may be the most probable causes of the issue. Therefore, each most probable cause described herein may actually include multiple labor codes indicating multiple most probable causes.

In one example, the diagnostic knowledge module 48 determines a first most probable cause of the issue based on first diagnostic trouble codes identifying the issue and the service procedures for the vehicle 10. In addition, the diagnostic knowledge module 48 determines a second most probable cause of the issue based on second diagnostic trouble codes identifying the issue and the service procedures. The first diagnostic trouble codes are set more frequently on the other vehicles than the second diagnostic trouble codes. Thus, the first diagnostic trouble codes may be referred to as frequent diagnostic trouble codes, and the second diagnostic trouble codes may be referred to as infrequent diagnostic trouble codes.

The diagnostic knowledge module 48 determines the probabilities of the labor codes in the first most probable cause based on the number of times that the labor codes are specified in the service procedures for the first diagnostic trouble codes. The diagnostic knowledge module 48 may set the probability of each labor code in the first most probable cause equal to a percentage of the number of times that the labor code is specified in the service procedures for the first diagnostic trouble codes relative to the total number of times that all the labor codes are specified in the service procedures for the first diagnostic trouble codes. The diagnostic knowledge module 48 determines the probabilities of the labor codes in the second most probable cause based on the number of times that the labor codes are specified in the service procedures for the second diagnostic trouble codes. The diagnostic knowledge module 48 may set the probability of each labor code in the second most probable cause equal to a percentage of the number of times that the labor code is specified in the service procedures for the second diagnostic trouble codes relative to the total number of times that all the labor codes are specified in the service procedures for the second diagnostic trouble codes.

Figures 3A, 3B:
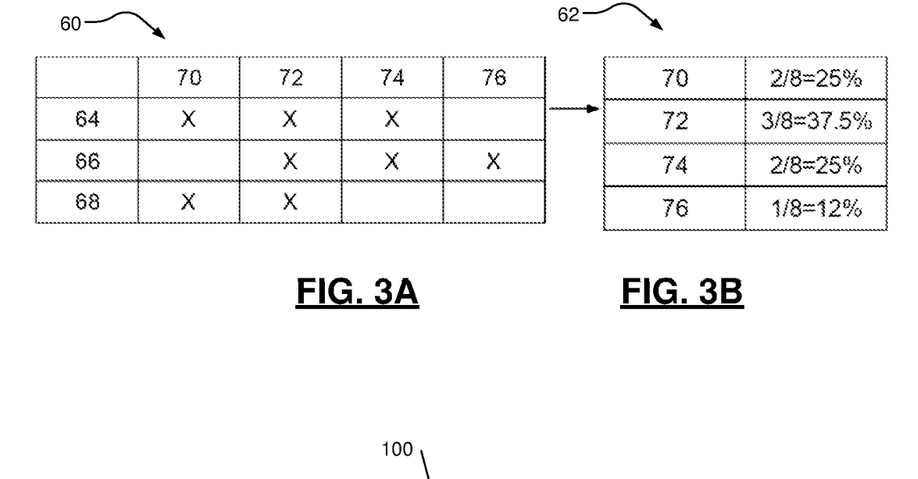
FIG. 3A is a table illustrating an example relationship between diagnostic trouble codes and labor codes according to the principles of the present disclosure.
FIG. 3B is a table illustrating an example root cause distribution according to the principles of the present disclosure.

Referring briefly to FIGS. 3A and 3B, a first table 60 and a second table 62 illustrate how the diagnostic knowledge module 48 may determine the probabilities of labor codes in a most probable cause based on the number of times that the labor codes are specified in the service procedures for diagnostic service codes set in the vehicle 10. The far left column of the first table 60 lists a first diagnostic trouble code 64, a second diagnostic trouble code 66, and a third diagnostic trouble code 68. The first, second, and third diagnostic trouble codes 64, 66, and 68 may identify a single issue on the vehicle 10. The header row of the first table 60 lists a first labor code 70, a second labor codes 72, a third labor code 74, and a fourth labor codes 76. Each row of the first table 60 below the header row may be referred to as a diagnostic trouble code (DTC)-to-labor code (LC) association. The DTC-to-LC associations are derived from the service procedures for the diagnostic trouble codes that are set.

The cells of the first table 60 marked with an "X" indicate that the labor code in the corresponding column is specified in the service procedures for the diagnostic trouble code(s) in the corresponding row(s). For example, in the column for the first labor code 70, there is an "X" in the row for the first diagnostic trouble code 64 and an "X" in the row for the third diagnostic trouble code 68. Thus, the first labor code 70 is specified in the service procedure for the first diagnostic trouble code 64 and in the service procedure for the third diagnostic trouble code 68.

The second table 62 illustrates how the probabilities of the first, second, third, and fourth labor codes 70, 72, 74, and 76 may be determined based on the number of times that first, second, third, and fourth labor codes 70, 72, 74, and 76 are specified in the service procedures. The left column of the second table 62 lists the first, second, third, and fourth labor codes 70, 72, 74, and 76. The right column of the second table 62 lists the probabilities corresponding to the first, second, third, and fourth labor codes 70, 72, 74, and 76, with each probability corresponding to the labor code listed in the same row as that probability.

To determine the probability of each labor code, the diagnostic knowledge module 48 determines the percentage of the number of times that the labor code is specified in the service procedures for the diagnostic trouble codes identifying the issue relative to the number of times that all labor codes are specified in the service procedures for diagnostic trouble codes identifying the issue. For example, the first labor code 70 is specified twice in the service procedures for the first, second, and third diagnostic trouble codes 64, 66, and 68—once for the first diagnostic trouble code 64 and once for the third diagnostic trouble code 68. In addition, the first, second, third, and fourth labor codes 70, 72, 74, and 76 are specified eight times in the service procedures for the first, second, and third diagnostic trouble codes 64, 66, and 68. Thus, the diagnostic knowledge module 48 determines the probability of the first labor code 70 by dividing two by eight and calculating the equivalent percentage.

Referring again to FIG. 2, the machine learning module 50 determines a third most probable cause of the issue on the vehicle 10 based on the repair data and the diagnostic trouble codes identifying the issue. In one example, the machine learning module 50 determines the probabilities of the labor codes in the third most probable cause based on the number of times that performing the tasks identified by the labor codes resolved the issue when the diagnostic trouble codes were set in the other vehicles. In one example, the machine learning module 50 determines the third most probable cause using a mathematical model that relates the diagnostic trouble codes to the probabilities of the labor codes based on the repair data. The machine learning module 50 uses machine learning to periodically update the mathematical model as the repair data is updated so that the mathematical model better represents the relationship between the diagnostic trouble codes and the probabilities. The machine learning module 50 may determine the third most probable cause using only the repair data associated with the diagnostic trouble codes that are set frequently on the other vehicles.

The machine learning module 50 may determine that a diagnostic trouble codes occurs frequently when the frequency of repairs associated with the diagnostic trouble code is greater than a threshold (e.g., a predetermined frequency). Otherwise, the machine learning module 50 may determine that the diagnostic trouble code occurs infrequently. The machine learning module 50 may adjust the threshold based on the repair data using machine learning. For example, the machine learning module 50 may adjust the threshold as the frequencies of the repairs associated with all of the diagnostic trouble codes change.

The physics model module 52 determines a fourth most probable cause of the issue on the vehicle 10 based on a physics model that relates a symptom of the vehicle 10 to a failure mode of the vehicle 10. The vehicle 10 has the symptom when one or more operating parameters of the vehicle 10 is/are within a predetermined range. The physics model module 52 may determine the probabilities of the labor codes included in the fourth most probable cause using a predetermined relationship between the failure mode of the vehicle 10 and the labor code probabilities. For example, the failure mode may be identified by one or more diagnostic trouble codes and parameter values based on a physics model of the system, and the physics model module 52 may determine the probabilities of the labor codes in the fourth most probable cause based on the relations between the failure modes and the labor codes. The diagnostic knowledge module 48, the machine learning module 50, and the physics model module 52 may be referred to as a first MPC module, a second MPC module, and a third MPC module, respectively.

The integrated MPC module 54 determines an integrated most probable cause of the issue on the vehicle 10 based on two or more (e.g., all) of the first, second, third, and fourth most probable causes. In one example, the integrated MPC module 54 sets the integrated most probable cause equal to a sum of (i) a product of a first weighting value and the first most probable cause, (ii) a product of a second weighting value and the second most probable cause, (iii) a product of a third weighting value and the third most probable cause, and (iv) a product of a fourth weighting value and the fourth most probable cause. In other words, the integrated MPC module 54 multiplies the labor code probabilities in each of the first, second, third, and fourth most probable causes by the corresponding weighting value and sums the resulting products for each labor code to obtain the labor code probabilities in the integrated most probable cause. Thus, the probabilities in the integrated most probable cause are determined based on the probabilities in the first, second, third, and fourth most probable causes and the corresponding weighting values.

The integrated MPC module 54 controls the user interface device 42 to generate a message indicating the integrated most probable cause. The integrated MPC module 54 controls the user interface device 42 by outputting a control signal thereto. In one example, the integrated MPC module 54 controls the user interface device 42 to display the labor codes included in the integrated most probable cause and the corresponding probabilities. The integrated MPC module 54 may be referred to as a user interface device (UID) control module.

Figure 5:
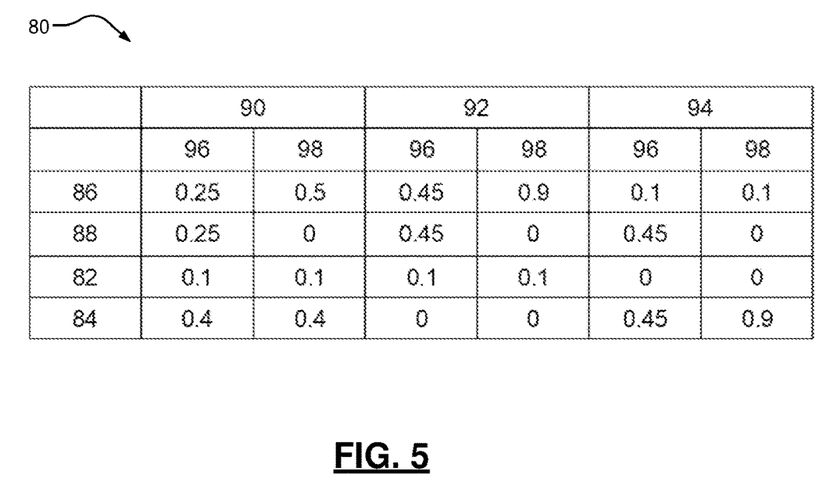
FIG. 5 is a table illustrating example weighting values according to the principles of the present disclosure.

The example implementation of the MPC module 38 shown in FIG. 2 further includes a root cause distribution module 56 and a weighting value module 58. The root cause distribution module 56 determines an actual root cause distribution based on the repair data for the other vehicles associated with the diagnostic trouble codes identifying the issue on the vehicle 10. The actual root cause distribution indicates all of the labor codes identifying tasks that were performed when the diagnostic trouble codes were set on the other vehicles and the frequencies at which those tasks were performed on the other vehicles. The root cause distribution module 56 outputs the actual root cause distribution The weighting value module 58 determines the first, second, third, and fourth weighting values based on the frequencies at which the diagnostic trouble codes identifying the issue on the vehicle 10 are set on the other vehicles and whether the physics model applies to the issue. Referring briefly to FIG. 5, a table 80 illustrates weighting values for frequent and infrequent diagnostic trouble codes and for determining the integrated most probable cause with and without the physics model. The weighting values are listed in the far left column of table 80 and include a first weighting value 82, a second weighting value 84, a third weighting values 86, and a fourth weighting values 88. The integrated MPC module 54 applies the first, second, third, and fourth weighting values 82, 84, 86, and 88 to the first, second, third, and fourth most probable causes, respectively. The values listed in each of the bottom four rows of the table 80 correspond to the weighting value in the corresponding row.

The weighting values listed below a first header 90 of the table 80 correspond to the case where both frequent and infrequent diagnostic trouble codes are set in the vehicle 10. The weighting values listed below a second header 92 of the table 80 correspond to the case where only frequent diagnostic trouble codes are set in the vehicle 10. The weighting values listed below a third header 94 of the table 80 correspond to the case where only infrequent diagnostic trouble codes are set in the vehicle 10. The weighting values listed below a first sub-header 96 of the table 80 are for determining the integrated most probable cause with the fourth most probable cause obtained using the physics model. The weighting values listed below a second sub-header 98 of the table 80 are for determining the integrated most probable cause without the fourth most probable cause.

As indicated by the table 80, the weighting value module 58 may set the first weighting value 82 to a value greater than zero (e.g., 0.1) for the case where only frequent diagnostic trouble codes are set and for the case where both frequent and frequent diagnostic trouble codes are set. Conversely, the weighting value module 58 may set the first weighting value 82 to zero for the case where only infrequent diagnostic trouble codes are set. The weighting value module 58 may set the first weighting value 82 in this manner since the first weighting value 82 is applied to the first most probable cause, which is determined using diagnostic knowledge associated with frequent diagnostic trouble codes.

The weighting value module 58 may set the second weighting value 84 to a value greater than zero (e.g., 0.4) for the case where only infrequent diagnostic trouble codes are set and for the case where both frequent and frequent diagnostic trouble codes are set. Conversely, the weighting value module 58 may set the second weighting value 84 to zero for the case where only frequent diagnostic trouble codes are set. The weighting value module 58 may set the second weighting value 84 in this manner since the second weighting value 84 is applied to the second most probable cause, which is determined using diagnostic knowledge associated with infrequent diagnostic trouble codes.

The weighting value module 58 may set the third weighting value 86 to a higher value (e.g., 0.45) for the case where only frequent diagnostic trouble codes are set since the third weighting value 86 is applied to the third most probable cause, which is determined with machine learning using only frequent diagnostic trouble codes. Conversely, the weighting value module 58 may set the third weighting value 86 to a lower value (e.g., 0.1) for the case where only infrequent diagnostic trouble codes are set. In addition, the weighting value module 58 may set the third weighting value 86 to a value between the lower and higher values (e.g., 0.25) for the case where both frequent and infrequent diagnostic trouble codes are set.

The weighting value module 58 may set the fourth weighting value 88 to a value greater than zero (e.g., 0.25) when the physics model applies, and the weighting value module 58 may set the fourth weighting value 88 to zero when the physics model does not apply. The weighting value module 58 may set the fourth weighting value 88 in this manner since the fourth weighting value 88 is applied to the fourth most probable cause, which is determined using the physics model. In addition, the weighting value module 58 may set the fourth weighting value 88 to a lower nonzero value (e.g., 0.25) for the case where both frequent and infrequent diagnostic trouble codes are set since the first and second weighting values 82 and 84 are both nonzero. Conversely, the weighting value module 58 may set the fourth weighting value 88 to a higher nonzero value (e.g., 0.45) for the case where only frequent or infrequent diagnostic trouble codes are set since one of the first and second weighting values 82 or 84 is equal to zero.

The weighting value module 58 may set one of the second and third weighting values 84 and 86 to a lower value (e.g., 0.45) when setting the fourth weighting value 88 to a nonzero value. The weighting value module 58 may set one of the second and third weighting values 84 and 86 to a higher value (e.g., 0.9) when setting the fourth weighting value 88 to zero. The weighting value module 58 may select one of the second and third weighting values 84 and 86 to adjust to a lower or higher value based on whether the diagnostic trouble code is frequent or infrequent.

Figure 4:
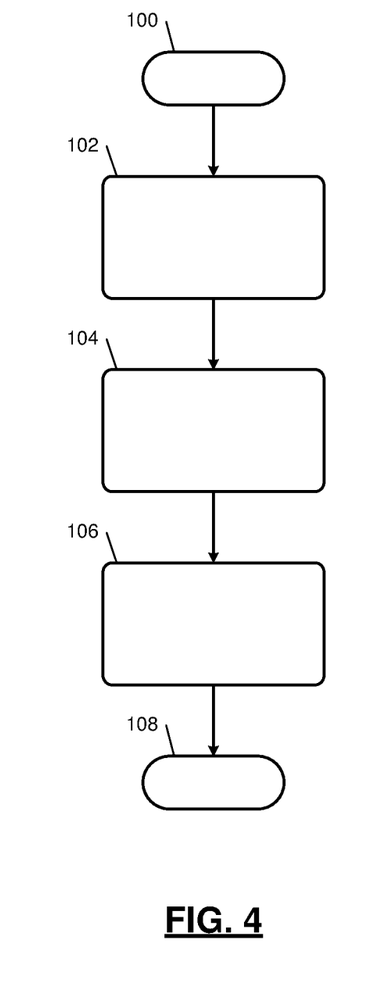
FIG. 4 is a flowchart illustrating an example method for determining a most probable cause of a vehicle issue using diagnostic knowledge according to the principles of the present disclosure.

Referring now to FIG. 4, a method for determining a most probable cause of an issue on the vehicle 10 using diagnostic knowledge begins at step 100. In the description of the methods set forth below, the modules of FIG. 2 perform the steps of the methods. However, the particular modules that perform the steps of the methods may differ from the description below. Additionally or alternatively, one or more steps of the methods may be performed independent of any module.

At step 102, the diagnostic knowledge module 48 derives associations between diagnostic trouble codes and labor codes based on service procedures for the model of the vehicle 10. For example, the diagnostic knowledge module 48 may determine a list of labor codes specified in the service procedures associated with each diagnostic trouble code and the number of times that each labor code is specified therein. Thus, the diagnostic knowledge module 48 derives associations between diagnostic trouble codes and labor codes based on service procedures for the vehicle 10 (or the model thereof). Step 102 may be performed during a design phase of the vehicle 10.

At step 104, the diagnostic knowledge module 48 selects some of the associations between diagnostic trouble codes and labor codes based on the diagnostic trouble codes that are actually set in the vehicle 10. In addition, the diagnostic knowledge module 48 may determine the number of times that each labor code is specified in the service procedures associated with the diagnostic trouble codes that are set in the vehicle 10. Step 104 may be performed during a diagnosis phase of the vehicle 10.

At step 106, using diagnostic knowledge, the diagnostic knowledge module 48 determines the most probable cause of the issue on the vehicle 10 based on the frequencies of the labor code occurrences associated with the diagnostic trouble codes identifying the issue. During the diagnosis phase, the diagnostic knowledge module 48 may perform step 106 using the associations derived in step 104. The method ends at step 108.

Figure 6:
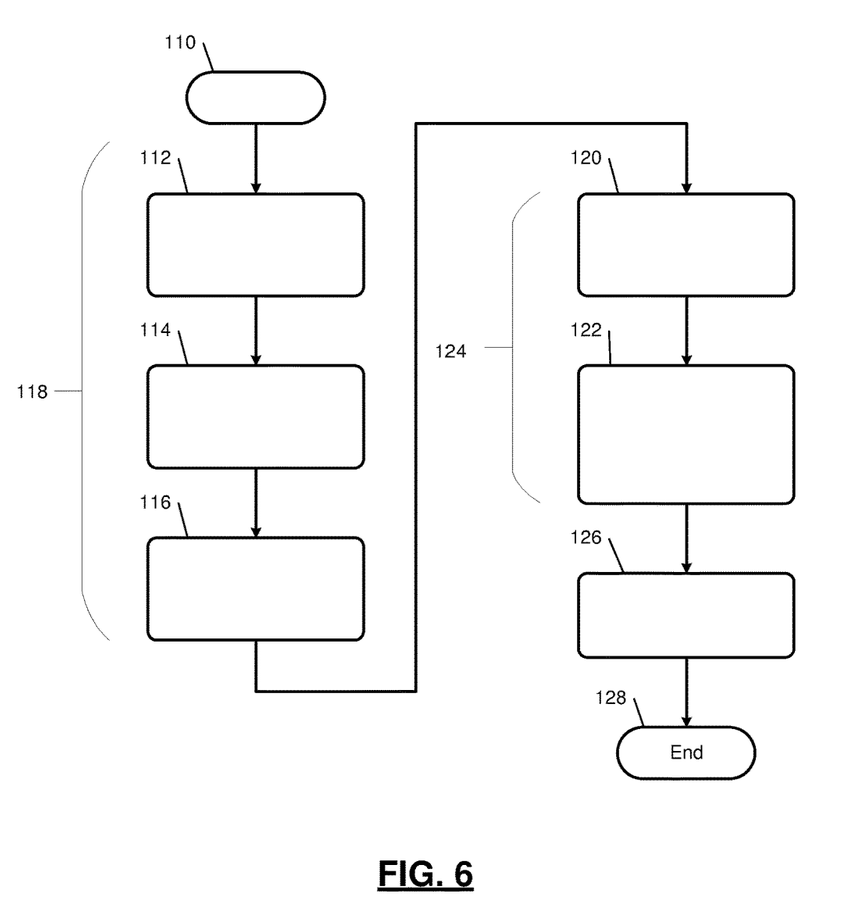
FIG. 6 is a flowchart illustrating an example method for determining a most probable cause of a vehicle issue using multiple diagnostic techniques according to the principles of the present disclosure.

Referring now to FIG. 6, a method for determining a most probable cause of an issue on the vehicle 10 using multiple diagnostic techniques begins at step 110. At step 112, the diagnostic knowledge module 48, the machine learning module 50, and the physics model module 52 create MPC models using diagnostic knowledge, machine learning, and a physics model, respectively. At step 114, the machine learning module 50 identifies frequent and infrequent diagnostic trouble codes based on repair data for the model of the vehicle 10. At step 116, the weighting value module 58 determines weighting values for most probable causes determined using the different MPC models. Steps 112, 114, and 116 may be performed during a design phase 118 of the vehicle 10 (or the model thereof).

At step 120, the diagnostic knowledge module 48, the machine learning module 50, and the physics model module 52 generate the most probable causes based on repair data for the model of the vehicle 10 using the MPC models. At step 122, the weighting value module 58 selects weighting values for the most probable causes based on whether the diagnostic trouble codes identifying the issue are frequent or infrequent and whether the physics model is applicable. Steps 120 and 122 may be performed during a diagnosis phase 124 of the model of the vehicle 10.

At step 126, the integrated MPC module 54 applies the weighting values to the corresponding most probable causes and determines the sum of the weighted most probable causes to obtain an integrated most probable cause of the issue. In other words, the integrated MPC module 54 multiplies the labor code probabilities in each most probable cause by the corresponding weighting value, and determines the sum of the weighted probabilities for each labor code. As a result, the integrated MPC module 54 obtains a single root cause distribution that represents the integrated most probable cause. The method ends at step 128.

Figure 7:
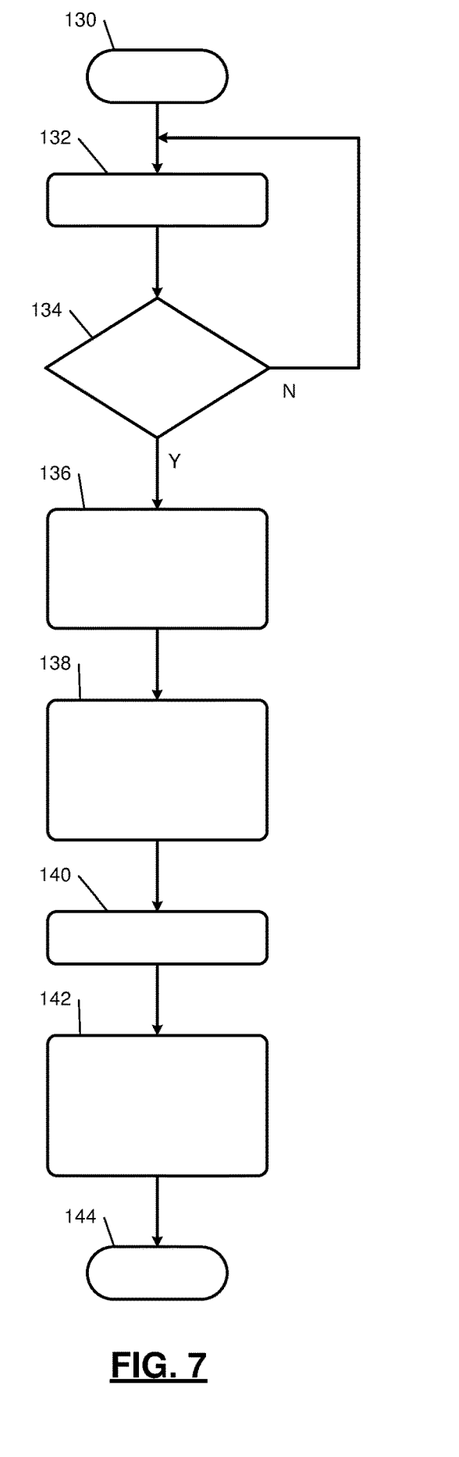
FIG. 7 is a flowchart illustrating an example method for adjusting the weighting values based on repair data according to the principles of the present disclosure.

Referring now to FIG. 7, method for adjusting weighting values based on repair data begins at step 130. At step 132, the repair data module 46 monitors repair data of vehicles other than the vehicle 10. The other vehicles may be the same model as the vehicle 10 and/or have the same system(s) as the vehicle 10.

At step 134, the machine learning module 50 determines whether the number of repairs corresponding to a diagnostic trouble code is greater than a threshold (e.g., a predetermined number). If the number of repairs corresponding to the diagnostic trouble code is greater than a threshold, the method continues at step 136. Otherwise, the method remains at step 132. Step 134 may be performed for each possible diagnostic trouble code.

At step 136, the cloud module 44 and/or the root cause distribution module 56 calculates the actual root cause distribution for the diagnostic trouble codes identifying an issue on the vehicle 10 based on the repair data. At step 138, the cloud module 44 and/or the weighting value module 58 determines distances (or differences) between (i) most probable causes of the issue determined using different MPC models and (ii) the actual labor code distribution. The cloud module 44 and/or the weighting value module 58 may calculate these distances using a distance metric such as Jensen-Shannon divergence.

At step 140, the cloud module 44 and/or the weighting value module 58 normalizes each distance by dividing each distance by the sum of all of the distances. At step 142, the cloud module 44 and/or the weighting value module 58 determines new weighting values based on previous weighting values and the normalized distances. For example, the cloud module 44 and/or the weighting value module 58 may subtract each normalized distance from one, and then multiply the difference by the previous weighting value corresponding to the normalized distance to obtain the corresponding new weighting value. The method ends at step 144.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
   a first most probable cause (MPC) module configured to determine a first most probable cause of an issue on a vehicle based on at least one service procedure for the vehicle;
   a second MPC module configured to determine a second most probable cause of the issue based on repair data for other vehicles;
   an integrated MPC module configured to determine an integrated most probable cause of the issue based on the first and second most probable causes; and
   a user interface device (UID) control module that at least one of: visibly displays a message including the integrated most probable cause of the issue on a display; audibly outputs a message including the integrated most probable cause of the issue via a speaker; and outputs a tactile message indicative of the integrated most probable cause of the issue via a vibrating motor.

2. The system of claim 1 wherein the second MPC module is configured to determine the second most probable cause of the issue based on the repair data using machine learning.

3. The system of claim 1 wherein the repair data includes a diagnostic trouble code identifying the issue, a frequency at which the diagnostic trouble code are set on the other vehicles, and a vehicle operating parameter captured when the issue occurred on the other vehicles.

4. The system of claim 1 wherein:
   each of the first, second, and integrated most probable causes includes labor codes and corresponding probabilities; and
   each probability indicates a likelihood that performing a task identified by the corresponding labor code will resolve the issue.

5. The system of claim 4 wherein the second MPC module is configured to determine the probabilities of the labor codes in the second most probable cause based on a number of times that performing the tasks identified by the labor codes resolved the issue in the other vehicles.

6. The system of claim 4 wherein:
   the issue is identified using multiple diagnostic trouble codes;
   the at least one service procedure includes multiple service procedures, with each service procedure corresponding to one of the diagnostic trouble codes; and
   the first MPC module is configured to determine the probabilities of the labor codes based on a number of times that the labor codes are specified in the service procedures for the diagnostic trouble codes.

7. The system of claim 4 wherein the integrated MPC module is configured to:
   determine a first weighting value and a second weighting value; and
   set the integrated most probable cause equal to a sum of (i) a product of the first weighting value and the first most probable cause and (ii) a product of the second weighting value and the second most probable cause.

8. The system of claim 7 wherein the integrated MPC module is configured to:
   determine an actual root cause distribution based on the repair data for the other vehicles and diagnostic trouble codes identifying the issue; and
   adjust the first and second weighting values based on (i) a first distance between the first most probable cause and the actual root cause distribution and (ii) a second distance between the second most probable cause and the actual root cause distribution.

9. The system of claim 8 wherein the integrated MPC module is configured to determine the first and second weighting values based on a frequency of the diagnostic trouble codes identifying the issue.

10. The system of claim 1 wherein the first MPC module is configured to:
    determine the first most probable cause for a first diagnostic trouble code identifying the issue, the first diagnostic trouble code occurring on the other vehicles at a first frequency; and
    determine a third most probable cause for a second diagnostic trouble code identifying the issue, the second diagnostic trouble code occurring on the other vehicles at a second frequency that is less than the first frequency.

11. The system of claim 1 further comprising a third MPC module configured to determine a third most probable cause of the issue based on a physics model that relates a symptom of the vehicle to a failure mode of the vehicle, wherein the vehicle has the symptom when an operating parameter of the vehicle is within a predetermined range.

12. The system of claim 11 wherein the integrated MPC module is configured to:
    determine a first weighting value, a second weighting value, and a third weighting value; and
    set the third most probable cause equal to a sum of (i) a product of the first weighting value and the first most probable cause, (ii) a product of the second weighting value and the second most probable cause, and (iii) a product of the third weighting value and the third most probable cause.

13. The system of claim 12 wherein the integrated MPC module is configured to determine the first, second, and third weighting values based on (i) a frequency of a diagnostic trouble code identifying the issue and (ii) whether the physics model applies to the issue.

14. A system comprising:
    a diagnostic knowledge module configured to determine a most probable cause of an issue on a vehicle based on diagnostic trouble codes identifying the issue and service procedures for the vehicle and the diagnostic trouble codes; and a user interface device (UID) control module that at least one of: visibly displays a message including the most probable cause of the issue on a display; audibly outputs a message including the most probable cause of the issue via a speaker; and outputs a tactile message indicative of the most probable cause of the issue via a vibrating motor.

15. The system of claim 14 wherein:

the most probable cause includes labor codes and corresponding probabilities, each probability indicating a likelihood that performing a task identified by the corresponding labor code will resolve the issue; and the diagnostic knowledge module is configured to determine the probabilities of the labor codes based on a number of times that the labor codes are specified in the service procedures.

16. A system comprising:

a diagnostic knowledge module configured to:
   determine a first most probable cause of an issue on a vehicle based on a first diagnostic trouble code identifying the issue and service procedures for the vehicle, the first diagnostic trouble code occurring at a first frequency on other vehicles;
   determine a second most probable cause of the issue based on a second diagnostic trouble code identifying the issue and the service procedures for the vehicle, the second diagnostic trouble code occurring at a second frequency on the other vehicles that is less than the first frequency, each of the service procedures corresponding to one of the first and second diagnostic trouble codes;

a machine learning module configured to determine a third most probable cause of the issue based on repair data for other vehicles using machine learning;

a physics model module configured to determine a fourth most probable cause of the issue based on a physics model that relates an operating parameter of the vehicle to a failure mode of the vehicle;

an integrated MPC module configured to determine an integrated most probable cause of the issue based on the first, second, third, and fourth most probable causes; and a user interface device (UID) control module that at least one of: visibly displays a message including the integrated most probable cause of the issue on a display; audibly outputs a message including the integrated most probable cause of the issue via a speaker; and outputs a tactile message indicative of the integrated most probable cause of the issue via a vibrating motor.

17. The system of claim 16 wherein:

each of the first and second most probable causes includes labor codes and corresponding probabilities, each probability indicating a likelihood that performing a task identified by the corresponding labor code will resolve the issue; and the diagnostic knowledge module is configured to:
   determine the probabilities of the labor codes in the first most probable cause based on a number of times that the labor codes are specified in the service procedures for the first diagnostic trouble code; and
   determine the probabilities of the labor codes in the second most probable cause based on a number of times that the labor codes are specified in the service procedures for the second diagnostic trouble code.

18. The system of claim 16 wherein the integrated MPC module is configured to:
   determine a first weighting value, a second weighting value, a third weighting value, and a fourth weighting value; and
   set the integrated most probable cause equal to a sum of (i) a product of the first weighting value and the first most probable cause, (ii) a product of the second weighting value and the second most probable cause, (iii) a product of the third weighting value and the third most probable cause, and (iv) a product of the fourth weighting value and the fourth most probable cause.

19. The system of claim 18 wherein the integrated MPC module is configured to determine the first, second, third, and fourth weighting values based on (i) the first frequency at which the first diagnostic trouble code is set on the other vehicles, (ii) the second frequency at which the second diagnostic trouble code is set on the other vehicles, and (iii) whether the physics model applies to the issue.

20. The system of claim 18 wherein the integrated MPC module is configured to:
   determine an actual root cause distribution based on the repair data for the other vehicles and the diagnostic trouble codes identifying the issue; and
   adjust the first, second, third, and fourth weighting values based on (i) a first distance between the first most probable cause and the actual root cause distribution, (ii) a second distance between the second most probable cause and the actual root cause distribution, (iii) a third distance between the third most probable cause and the actual root cause distribution, and (ii) a fourth distance between the fourth most probable cause and the actual root cause distribution.

\* \* \* \* \*